United States Patent
Mishra et al.

(10) Patent No.: US 11,256,237 B1
(45) Date of Patent: Feb. 22, 2022

(54) METHOD AND APPARATUS TO AUTOMATE PROCESS HAZARD, LOPA AND SAFETY PLC APPLICATION PROGRAM VALIDATION FOR SAFETY INSTRUMENTED SYSTEMS

(71) Applicant: SCHNEIDER ELECTRIC SYSTEMS USA, INC., Foxboro, MA (US)

(72) Inventors: Ajay Mishra, Lake Forest, CA (US); Diana Ivanov, Rancho Santa Margarita, CA (US); Erna Banchik, Rancho Santa Margarita, CA (US)

(73) Assignee: Schneider Electric Systems USA, Inc., Foxboro, MA (US)

( * ) Notice: Subject to any disclaimer, the term of this patent is extended or adjusted under 35 U.S.C. 154(b) by 0 days.

(21) Appl. No.: 17/072,735

(22) Filed: Oct. 16, 2020

(51) Int. Cl.
G05B 19/418 (2006.01)

(52) U.S. Cl.
CPC ..... G05B 19/4184 (2013.01); G05B 19/4187 (2013.01); G05B 19/41885 (2013.01)

(58) Field of Classification Search
None
See application file for complete search history.

(56) References Cited

U.S. PATENT DOCUMENTS

| | | | |
|---|---|---|---|
| 2007/0152709 A1* | 7/2007 | Gerhart | G05B 9/02 326/41 |
| 2009/0204232 A1* | 8/2009 | Guru | G06Q 50/04 700/9 |

* cited by examiner

Primary Examiner — Carlos R Ortiz Rodriguez
(74) Attorney, Agent, or Firm — Locke Lord LLP (57) ABSTRACT

A method is provided for automatically or semi-automatically analyzing process hazards and validating protection mechanisms for an industrial process. The method can involve establishing communication between a simulation tool and a process hazard analysis tool. The simulation tool simulates operation of the process according to a process model. The method can further involve creating, using the process hazard analysis tool, conditions for hazards in the process based on information learned about the industrial process from the simulation tool; for each of the hazards, simulating the hazards using the simulation tool and attempting to prevent the hazards using the process hazard analysis tool by introducing protective mechanism(s) to the process; and evaluating effectiveness of the introduced protective mechanisms for each of the hazards and creating safety requirements for the process based on the evaluated effectiveness. The safety requirements are used to generate a safety application program, such as for a PLC.

21 Claims, 10 Drawing Sheets

Hazard Identification

700

| | Hazard |
|---|---|
| #1 | If there is cooling failure due to loss of cooling water, the column will get damaged catastrophically |
| [ . . .] | |
| #N | [ . . . ] |

FIG. 7

Layers of Protection Analysis (LOPA)

800

| Impact & Severity | Initiating Cause | | Process Design | DCS | Alarms | SIS | Relief Valve | Mitigated likelihood |
|---|---|---|---|---|---|---|---|---|
| Hazard #1:<br><br>Catastrophic Rupture of distillation column Max. Likelihood $10^{-6}$ / year (Target) | Loss of cooling water once every 10 years ($10^{-1}$) | | Stronger piping<br><br>$10^{-2}$ | Logic in DCS to monitor shutdown<br><br>$10^{-1}$ | 0 | Over temperature Logic in SIS will shutdown<br><br>$10^{-3}$ | Yes<br><br>$10^{-2}$ | $10^{-9}$<br><br>*Meets target criteria* |
| [ ... ] | [ ... ] | | [ ... ] | [ ... ] | [ ... ] | [ ... ] | [ ... ] | [ ... ] |
| Hazard #N:<br><br>[ ... ] | [ ... ] | | [ ... ] | [ ... ] | [ ... ] | [ ... ] | [ ... ] | [ ... ] |

Independent Layers of Protection

FIG. 8

Safety Requirement(s) Specification (SRS)

900

| Hazard | SRS |
|---|---|
| #1 | If the cooling water flow sensor measures low flow for more than 10 seconds, then the safety logic solver shall shutdown the system<br><br>[ . . . ] |
| [ . . .] | |
| #N | [ . . . ] |

METHOD AND APPARATUS TO AUTOMATE PROCESS HAZARD, LOPA AND SAFETY PLC APPLICATION PROGRAM VALIDATION FOR SAFETY INSTRUMENTED SYSTEMS

FIELD

The present disclosure is generally directed to hazard/safety analysis of an industrial process, and more particularly, to performing automated or semi-automated hazard/safety analysis of an industrial process using an artificial intelligence-based tool(s).

BACKGROUND

As part of Safety Instrumented System (SIS), a safety PLC (programmable logic controller) is a key protection layer to prevent industrial accidents in plants such as oil refineries, chemical plants, etc. There are additional layers of protection including the basic process control system and physical methods such as pressure relief valves. To program a safety PLC to prevent accidents, the process hazards are defined and allocated to the different layers of protection in a plant by safety personnel; and a safety requirements specification (SRS) is written. The safety PLC's application program is written to satisfy the requirements of the safety requirements specification.

SUMMARY

In accordance with an embodiment, a system and method are provided for automatically or semi-automatically analyzing process hazards and validating protection mechanisms for an industrial process. The system and method involve establishing communication between a simulation tool and a process hazard analysis tool. The simulation tool is configured to simulate operation of the industrial process according to a process model. The simulation tool and the process hazard analysis tool are executed on or across one or more computers. The method and system can further involve: creating, using the process hazard analysis tool, conditions for hazards in the industrial process based on information learned about the industrial process from the simulation tool; for each of the hazards, simulating the hazards using the simulation tool and attempting to prevent the hazards using the process hazard analysis tool by introducing one or more protective mechanisms from a plurality of potential protective mechanisms to the industrial process; and evaluating effectiveness of the introduced protective mechanisms for each of the hazards and creating safety requirements (e.g., SRS, etc.) for the industrial process based on the evaluated effectiveness. The system and method can also involve generating an application program for a safety programmable logic controller (PLC) in a safety instrumented system (SIS) to satisfy the safety requirements; and testing the application program to confirm that the application program is able to prevent the hazards in the industrial process.

In some embodiments, to simulate the hazards and/or to evaluate effectiveness, the process hazard analysis tool implements a plurality of agents for interacting with the simulation tool and for changing operating conditions in the industrial process simulated by the simulation tool. The plurality of agents can include: at least one first agent to cause conditions for hazards in the industrial process simulated by the simulation tool, and at least one second agent to introduce protective mechanisms to prevent hazard conditions in the industrial process simulated by the simulation tool.

In some embodiments, to simulate the hazards and/or to evaluate effectiveness, the process hazard analysis tool is configured to: initiate a plurality of adversarial agent teams each of which comprises first and second agents; for each adversarial agent team, assign randomly one or more inputs, associated with the process model, for use by the adversarial agent team to control an operational state of the industrial process simulated by the simulation tool; for each adversarial agent team, assign reward points when the respective first agent increases a chance of an associated hazard and/or when the respective second agent decreases a chance of the associated hazard; for each adversarial agent team, create a protection configuration including layers of protection for the associated hazard according to the interaction between the first and second agents of the adversarial agent team; for each adversarial agent team, calculate a reward score for the adversarial agent team using a reward function according to reward points accumulated by the adversarial agent team; and eliminate duplicative adversarial agent team(s) from the plurality of adversarial agent teams according to their reward scores.

In some embodiments, the process hazard analysis tool can create safety requirements for the industrial process based on the protection configuration of the remaining adversarial agent teams from the plurality of adversarial agent teams. Furthermore, the application program can be tested using the process hazard analysis tool and the simulation tool to confirm that the application program is able to prevent the hazards in the industrial process. The first agent of the process hazard analysis tool can cause conditions for hazards in the industrial process simulated by the simulation tool. The application program can prevent hazard conditions in the industrial process simulated by the simulation tool.

In some embodiments, the process hazard analysis tool can be further configured to generate a cause and effect matrix associated with inputs to and outputs from the simulation tool when simulating the industrial process, and to create the safety requirements according to the cause and effect matrix. Furthermore, the inputs can comprise an addition of protective mechanisms by the second agent into the industrial process simulated by the simulation tool. The outputs can also comprise a state of the operating conditions of the industrial process simulated by the simulation tool.

In some embodiments, the protective mechanisms can comprise at least one safety instrumented system which includes a set of equipment intended to reduce the risk due to a specific hazard. Furthermore, the first and/or second agent can be configured to control and monitor operating conditions in the industrial process simulated by the simulation tool according to the process model which is constrained by physical laws, scientific laws, and/or laws of nature.

Additional objects and advantages will be set forth in part in the description which follows, and in part will be obvious from the description, or may be learned by practice of the present disclosure and/or claims. At least some of these objects and advantages may be realized and attained by the elements and combinations particularly pointed out in the appended claims.

It is to be understood that both the foregoing general description and the following detailed description are exemplary and explanatory only and are not restrictive of the invention, as disclosed or claimed. The claims should be entitled to their full breadth of scope, including equivalents.

DESCRIPTION OF THE FIGURES

The description of the various example embodiments is explained in conjunction with the appended drawings.

DISCUSSION OF EXAMPLE EMBODIMENTS

A system and method are provided, which can automate the identification of process hazards in an industrial process, using an automated artificial intelligence (AI)-based analysis tool, which is coupled with a process model (for the industrial process to be analyzed) that is used to simulate the industrial process. The industrial process can include plant, facility and other potentially hazardous processes. The system and method can automatically identify the process hazards and the protection mechanisms to prevent hazards from becoming accidents. The resultant output, which is generated by the computer-implemented tool, is captured, for example, in the hazard analysis (e.g., identified potential hazards, etc.), layers of protection analysis, and the safety requirements specification. The safety requirements can thereafter be used to create a safety application program, such as for a programmable logic controller (PLC) employed in automation or other industrial systems. After the safety application program is created and integrated with the PLC hardware or PLC simulator, the program can be tested by the AI-based analysis tool to confirm that the PLC programing is able to prevent process hazards from becoming accidents.

The AI-based tool can include a simulator tool to simulate an industrial process according to a process model(s), and an a process hazard analysis tool such as an analyzer tool, which interacts with the simulator tool, to control the process simulation and to analyze the process simulation in order to output information for developing safety requirements for the evaluated process. Using the AI-based tool, a hazard analysis workflow can be modified to replace human knowledge based engineering with an AI-based tool that can create the outputs, for example, Process hazard analysis, Layers of Protection analysis (LOPA), Cause and Effect matrix, and Safety Requirements Specification (SRS). After the safety PLC application program is created from the outputs from the tool and made available, the PLC program can be tested by the tool to confirm that the programing is able to prevent the hazards in the industrial process.

For example a simplified process simulation (or process model) can be created by a human that captures the physics and constraints of the industrial process. The tool can be based on AI multi-agent interactions in game-like arrangement, using adversarial agents. A first agent can create the conditions for a hazard, and a second agent can try to prevent the hazard by introducing a protective mechanism(s) from a palette of available protection mechanisms. The process hazard analysis and the layers of protection analysis are the output when hazards are protected against by the second agent. The layers of protections can include prevention layers that attempt to stop the hazardous event from occurring, and can also include mitigation layers that reduce the consequences after a hazardous event occurs. Additional outputs for Cause and Effect matrix and Safety Requirements Specification are created from outputs of the process hazard analysis and the Layers of Protection analysis. After the Safety PLC application program is created, the program can also be tested by the AI-based tool with process simulation and process hazard analysis, by replacing the second agent in the tool with the safety PLC to confirm that the Safety PLC application program is adequate.

Using this approach, automated generation of the process hazard analysis, layers of protection and safety requirements can save time and effort, and can provide useful information to create an application program (e.g., PLC program) which can effectively prevent potential accidents in an industrial process. Automated creation of safety requirements in this way can give greater confidence of quality over human translation which may inadvertently miss items. The safety PLC application program to prevent accidents can be directly tested (or validated) against process hazards using the tool, thereby giving greater confidence in the correctness of the safety PLC application program. Accordingly, the system and method can improve productivity of process hazard/safety analysis, and reduce cost from human-centric to automation framework.

In some embodiments, a simplified process simulation model/process model (e.g., physics-based environment), and process variable can be loosely modelled as a simplified liquid flow. Additionally, maximum limits of components can be defined in the model. Two agent "player" adversaries similar to "hide-and-seek" AI game concept can be implemented, with agent pair(s) to compromise and protect, and each agent keeping "sight" of each other in the team. The AI game concept can employ machine learning approach by rewarding agents/teams for certain actions and using a reward function to discriminate between teams in order to identify optimal solutions. For example, many pairs are introduced to find or identify all the hazards and potential protection configurations against each hazard. Duplicate pairs can be removed by a policy when reward functions are calculated for the team (e.g., duplicate pairs and their analysis are eliminated or not according to their reward score). The AI-based analysis tool can use team-based reward to maximum protection, where the first agent on the team is rewarded by maximize risk of hazard and the second agent on the team is rewarded by reducing the risk of hazard determined by the first agent. Each adversarial agent can gain a point(s) when it takes an action of create a hazardous condition. Each protective agent can gain a point(s) when it takes a protective/mitigative action against its adversarial agent. The reward function is calculated for each team based on each of the team player's points.

A predefined set of risk mitigation "tools/palette" can be provided from which the AI can select for protection. Each mitigation action can have associated therewith a risk reduction profile. (e.g. 1oo2 (one out of two) output shutdown valve arrangement, pressure release valve. 2oo3 (two out of three) sensor arrangement, 1oo2 Sensor arrangement, sensor types—pressure, temperature, flow, level, gas detectors, flame detectors, other shutdown mechanisms, etc.). The total risk reduction can be allocated to each layer of the protection analysis, e.g. allocating a factor of 10 reduction to DCS layer and remainder to the SIS layer. A new paradigm of testing a Logic Solver programing (e.g., safety PLC application program) can be provided: the logic solver can be directly tested with the AI/plant simulations to confirm protection.

These and other example features of the present disclosure will be described below in further detail with reference to the figures.

Figure 1:
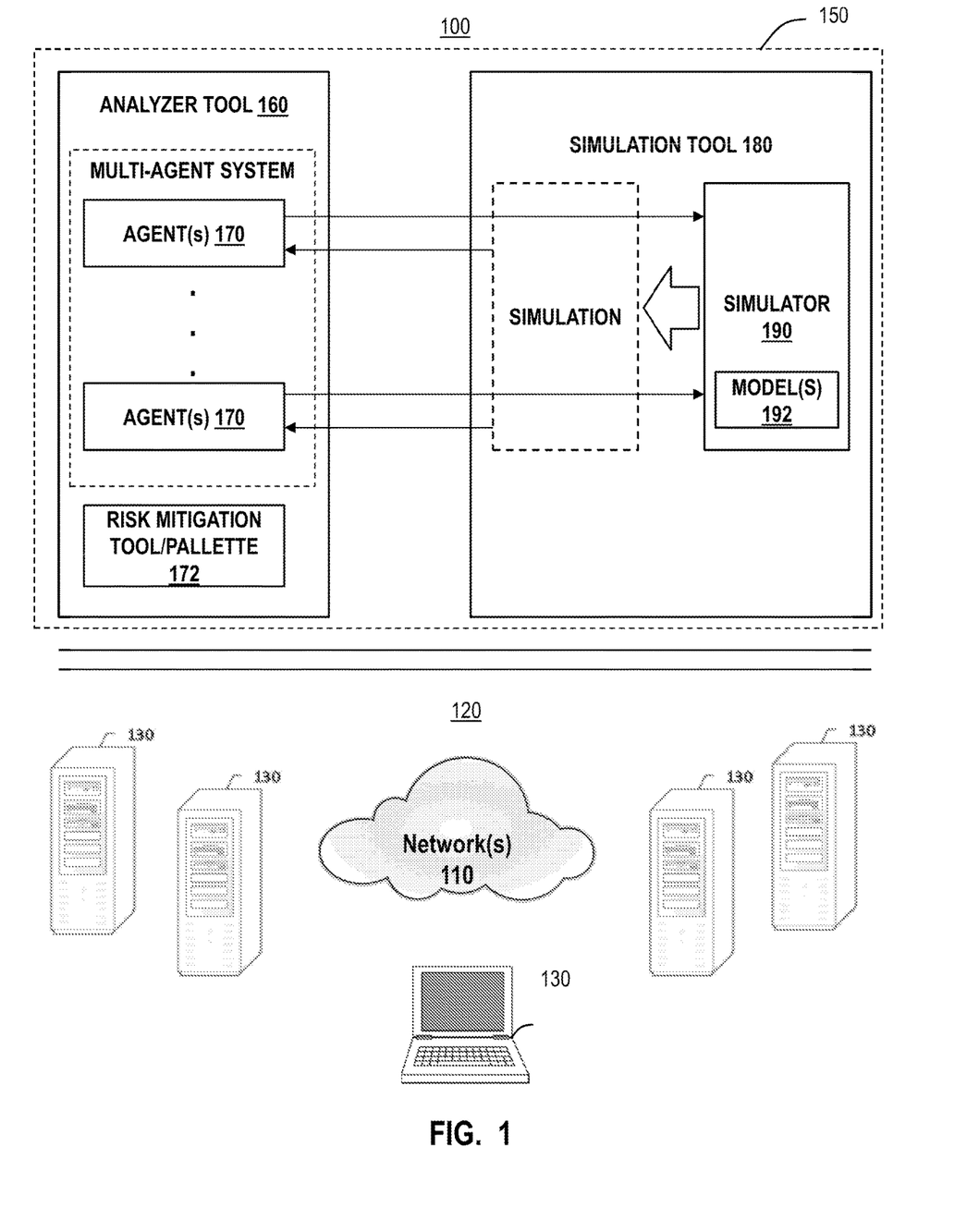
FIG. 1 is an overview of example components of an artificial intelligence (AI) based hazard (or safety) analysis system with an AI-based analysis tool(s) in accordance with an exemplary embodiment.

FIG. 1 is an overview of example components of an artificial intelligence (AI) based hazard/Safety analysis system 100 in accordance with an exemplary embodiment. The system 100 can implement an AI-based analysis tool (or AI-based analysis software/program) 150 for analyzing hazards for a simulated industrial process according to process model(s), and creating safety requirements which can be used to create a safety application program such as for a safety PLC in an automation or other system. The process model(s) can define the specifications for the industrial process to be simulated, including but not limited to the components/devices and their specifications/constraints, the process flow (of and between components/devices) including input and output parameters, physics-based parameters (e.g., physical laws, scientific laws, and/or laws of nature) and any other information which can be utilized to simulate the industrial process to be analyzed. For example, if the industrial process uses column distillation, then the process model can include information regarding the physical properties of the distillation piping used in the distillation, such as the rated temperature, pressure, etc. that the piping can withstand before a catastrophic damage occurs.

The AI-based analysis tool 150 can include a process hazard analysis tool (also referred to as a process safety analysis tool), such as an analyzer tool 160, and can also include a simulation tool 180, all of which can operate on a computing environment 120 in the system 100. The simulation tool 180 includes a simulator 190, which is configured to simulate an industrial process (or other process) according to process models(s) 192. The analyzer tool 160 is configured to interact with the simulator 190, such as for example, using machine learning techniques, in order to analyze hazards (or hazardous conditions) in the simulated process and to create safety requirements for the process. The analyzer tool 160 can employ a multi-agent approach in which multiple agents 170 can play adversarial roles to increase the chance of or cause a hazardous condition in the simulated process and/or to decrease the chance of or mitigate/prevent a hazardous condition in the simulated process using protection mechanisms. The protection mechanisms can be provided from a risk mitigation tool/palette 172. The risk mitigation tool/palette 172 can be a predefined set of risk mitigation "tools/palette" from which the analyzer tool 160 and its agent(s) can select protection mechanism(s) to prevent or mitigate hazards. Each mitigation action can have associated therewith a risk reduction profile (e.g. 1oo2 (one out of two) output shutdown valve arrangement, pressure release valve. 2oo3 (two out of three) sensor arrangement, 1oo2 sensor arrangement, sensor types—pressure, temperature, flow, level, gas detectors, flame detectors, other shutdown mechanisms, etc.).

Through the use of these agents 170, the analyzer tool 160 can identify all of the potential hazards in the industrial process as well as different potential protection configurations (e.g., different layers of protection or independent layers of protection) for each identified hazard. A reward-based strategy can be employed to assess the actions of the agents 170 in order to identify the optimal or best protection configurations for each potential hazard (e.g., the protection configuration with the least risk of the hazard occurring or the highest chance of preventing against the hazard, etc.). The analyzer tool 160 can then create a mapping of the cause and effect relationships between the identified hazards and the potential protection configuration and other components in the simulated process (e.g., cause and effect matrix). Using these relationships, the analyzer tool 160 can create safety requirements for the simulated process (e.g., SRS). Various examples of the multi-agent approach are described herein.

The computing environment 120 can include one or more computers 130, which may conduct communications with each other and other systems and devices over a network 110. The AI-based analysis tool 150 and other programs may be implemented on one computer 130, across a plurality of computer(s) 130 or in a cloud computing environment using computer(s) 130. The other programs may include program generators, such as a PLC program generator (or code generator), which can generate a safety application program for a PLC using the safety requirements created by the AI-based analysis tool 150. The safety application program can also be operated on a PLC simulator or PLC, and tested using the AI-based analysis tool 150 to ensure the protection efficacy of the safety application program.

Figure 2:
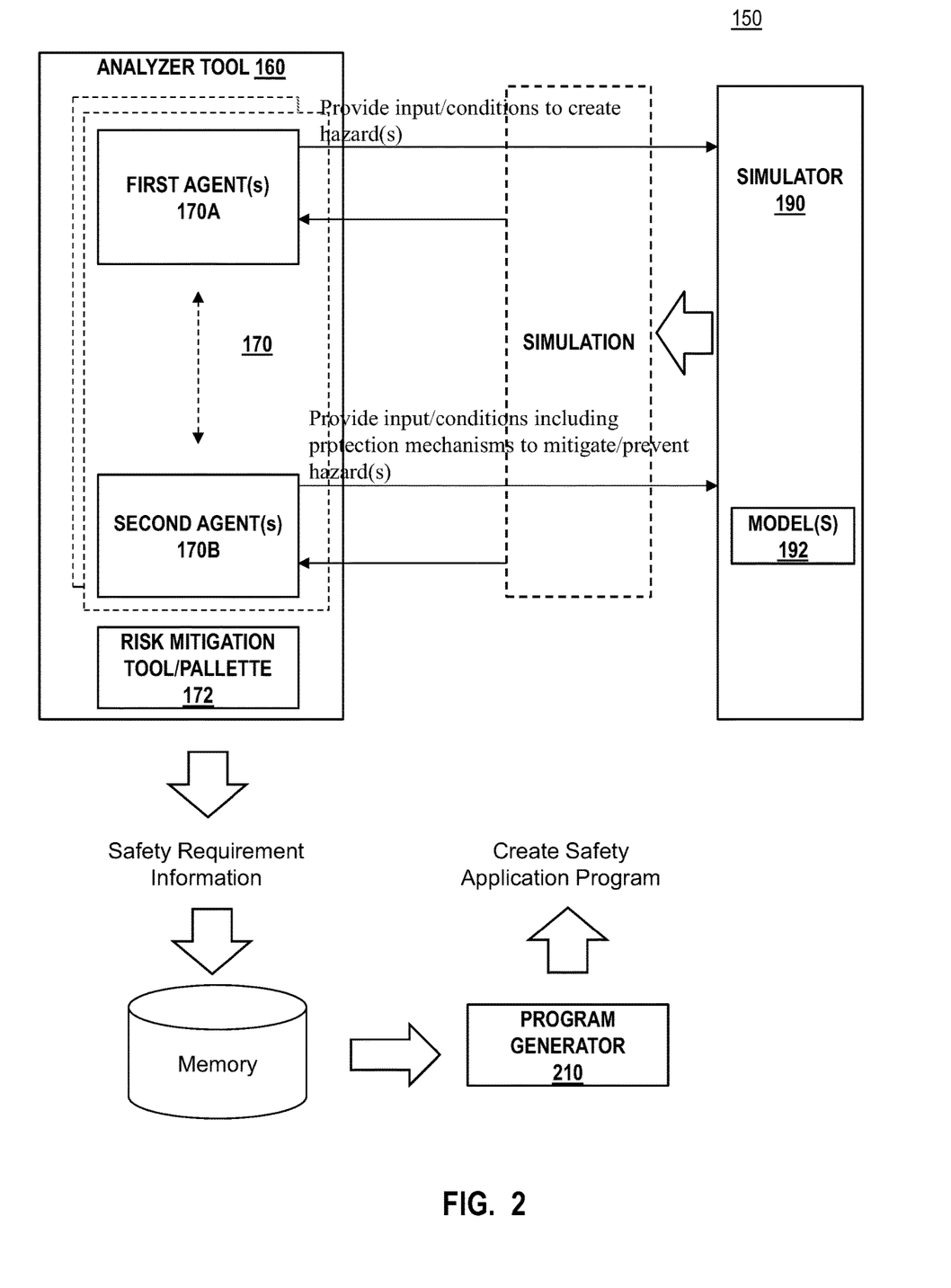
FIG. 2 illustrates a functional block diagram of an AI-based analysis tool, which employs multiple agents, for analyzing hazards of an industrial (or other) process and creating safety requirements for the process in accordance with an exemplary embodiment.

FIG. 2 illustrates a functional block diagram of the AI-based analysis tool 150, which employs agents 170, for analyzing hazards of an industrial process and creating safety requirements for the process in accordance with an embodiment. In this example the analyzer tool 160 can employ agents 170, such as adversarial agent teams, each of which includes a pair of agents, e.g., a first agent 170A and a second agent 170B. The first agent 170A or adversarial agent is configured to increase the chance of (or to cause) an occurrence of a hazard or hazardous condition in the simulated process, which is simulated by the simulator 190. The second agent 170B or protective agent is configured to decrease the chance of (or mitigate/prevent) an occurrence of a hazard or hazardous condition in the simulated process, using protection mechanisms such as selected from a risk mitigation tool/palette 172 or other predefined set of protection mechanisms. The agents 170A, 170B on each team can play against each other to identify a potential hazard and an associated protection configuration. The analyzer tool 160 can continue to introduce new agent teams until all possible hazards and protection configurations are identified for the simulated process. In various embodiments, the analyzer tool 160 can randomly assign each agent team an input(s), which may be identified in the process model, for changing a state of the operating conditions in the simulated process.

In some embodiments, the analyzer tool 160 can also employ a reward system during agent team play, such as reward-based machine learning techniques, to identify maximum protection configuration for each potential hazard or all hazards. For example, a first agent 170A can be rewarded by a maximize risk of hazard, and the second agent 170B can be rewarded when reducing the risk of hazard determined by the first agent 170A. Each first agent 170A can gain a point(s) (or other value) when it takes an action or creates a hazardous condition. Each second agent 170B can gain a point (or other value) when it takes a protective/mitigative action against its adversarial agent. The reward function is calculated for each team based on each agent player's points. Duplicate agent teams can be removed by a predefined policy according to the team's reward score, which is calculated for a team based on reward function(s) according to the team's accumulated points. For example, a duplicate team and its analysis is eliminated (or not considered) if it has a lower reward score.

Figure 3:
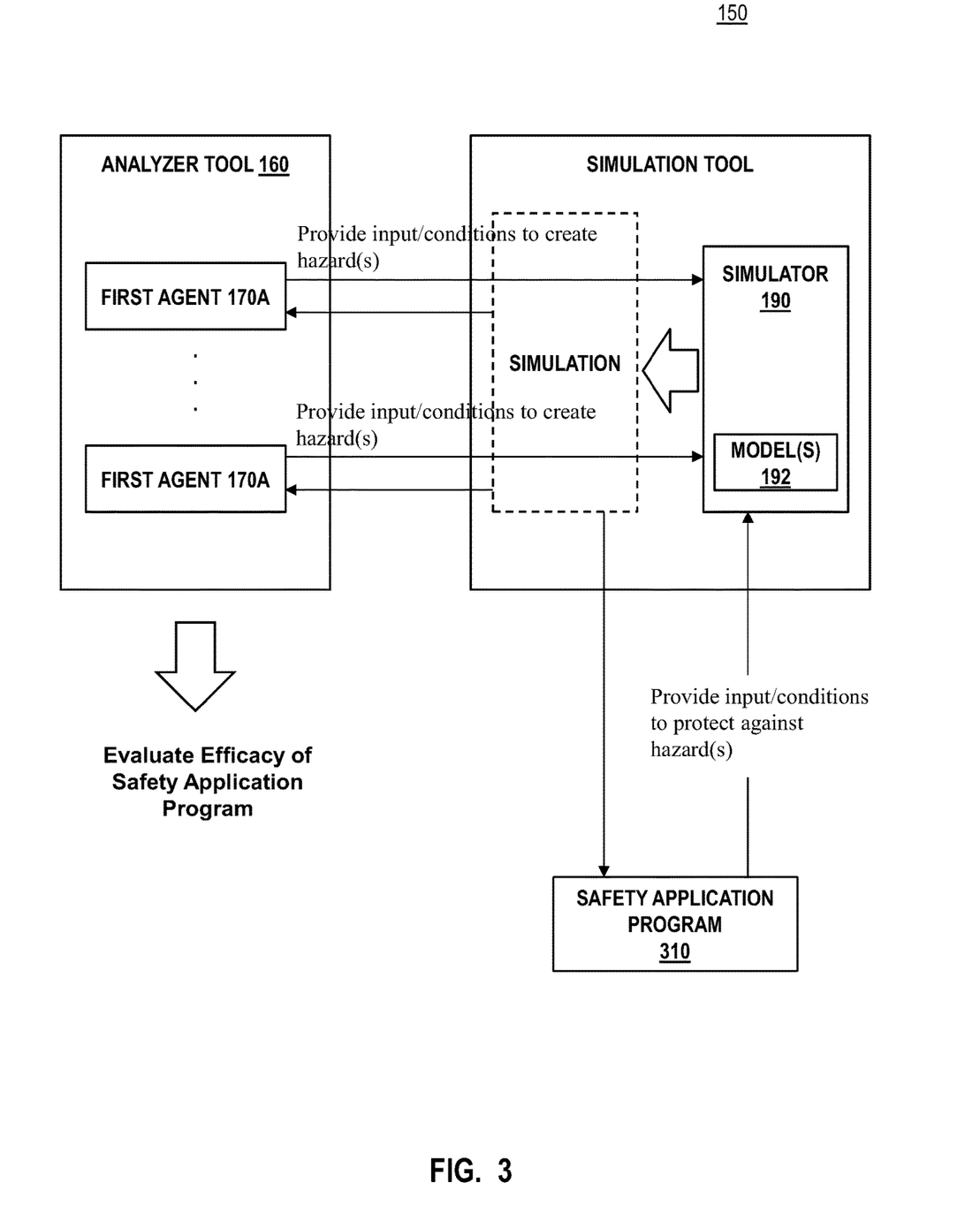
FIG. 3 illustrates a functional block diagram of an AI-based analysis tool, which employs agent(s), for testing a protection efficacy of an application program, such as a safety PLC application program, which is created using the safety requirements in accordance with an exemplary embodiment.

FIG. 3 illustrates a functional block diagram of an AI-based analysis tool 150, which employs agent(s) 170, for testing a protection efficacy of a safety application program 310, such as a safety PLC application program running on a PLC simulator or a PLC. In this example, the analyzer tool 160 can employ first agent(s) 170A or adversarial agent(s) to increase the chance of (or to cause) an occurrence of a hazard or hazardous condition in the simulated process by the simulator 190, similar to the embodiment described in FIGS. 1 and 2. The safety application program 310, which can act like a protective agent, attempts to mitigate actions by the first agent 170A and any hazard or hazardous conditions in the simulated process. The analyzer tool 160 can continue to introduce new first agents 170 until all possibilities of causing a hazard are exhausted, and thereafter, evaluate the protection efficacy of the safety application program (e.g., the safety application program was able to mitigate against all potential hazards in the simulated process).

Figure 4:
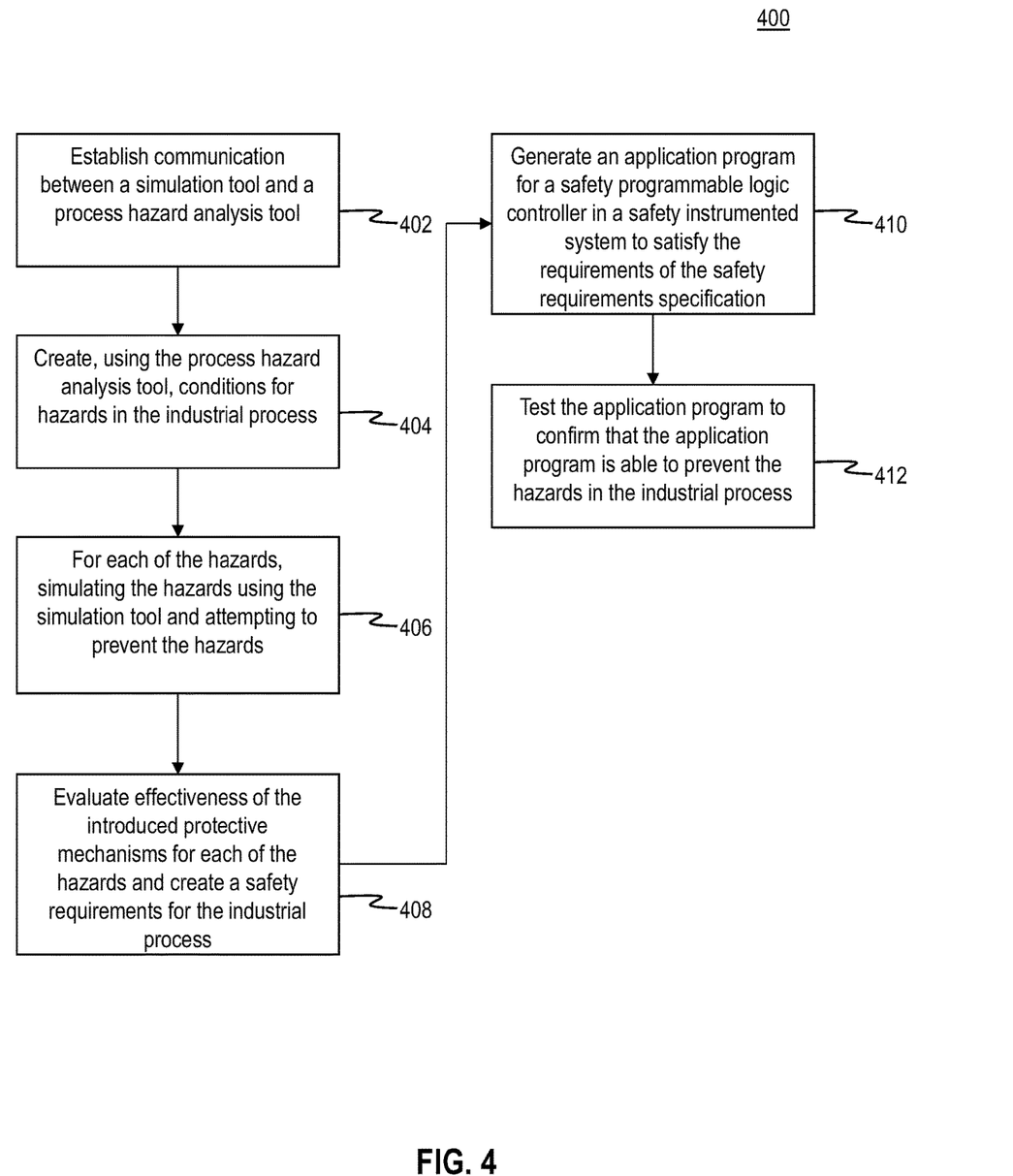
FIG. 4 illustrates an example method by which an AI-based analysis tool can be used to analyze hazards of an industrial process, and create safety requirements for the process in accordance with an exemplary embodiment.

FIG. 4 illustrates an example method 400 by which an AI-based analysis tool (e.g., 150) can be used to analyze hazards of an industrial process, and create safety requirements for the process in accordance with an embodiment.

At block 402, communication is established between a simulation tool (e.g., 180) and a process hazard analysis tool (e.g., 160). The simulation tool is configured to simulate operation of the industrial process according to a process model. The simulation tool and the process hazard analysis tool can be executed on or across one or more computers.

At block 404, conditions for hazards in the industrial process are created, using the process hazard analysis tool, based on information learned about the industrial process from the simulation tool.

At block 406, for each of the hazards, the hazards are simulated using the simulation tool, and attempts are made to prevent the hazards using the process hazard analysis tool. The process hazard analysis tool can introduce one or more protective mechanisms from a plurality of predefined potential protective mechanisms to the industrial process in order to mitigate/prevent the hazards.

At block 408, an effectiveness of the introduced protective mechanisms is evaluated for each of the hazards, and safety requirements (e.g., SRS) is created for the industrial process based on the evaluated effectiveness.

At block 410, an application program is generated for a safety programmable logic controller in a safety instrumented system to satisfy the requirements of the safety requirements.

At block 412, the application program is tested to confirm that the application program is able to prevent the hazards in the industrial process. In some embodiments, the application program can be tested using the process hazard analysis tool and the simulation tool.

Figure 5:
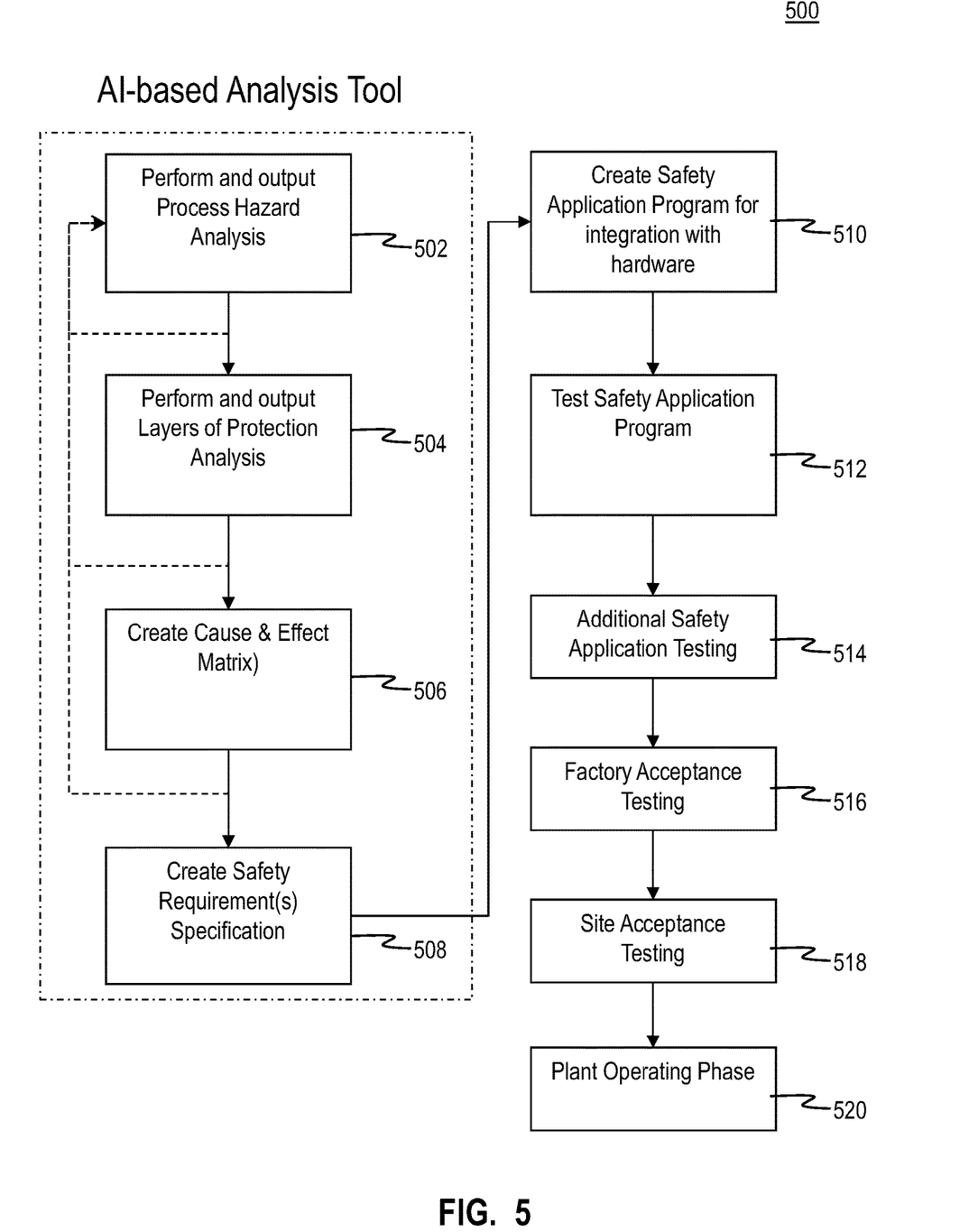
FIG. 5 illustrates an example method for implementing a safety engineering and lifecycle in which an AI-based analysis tool can be used to analyze hazards of an industrial process, and create safety requirements for the process in accordance with an exemplary embodiment.

FIG. 5 illustrates an example method 500 for implementing safety engineering and lifecycle in which an AI-based analysis tool (e.g., 150) can be used to analyze hazards of an industrial process, and create safety requirements for the process in accordance with an embodiment. As previously discussed, the AI-based analysis tool, which can employ multiple agents, can provide for various analysis and outputs, such as process hazard analysis, Layers of Protection Analysis (LOPA), Cause and Effect Matrix, and Safety Requirements System (SRS).

For example, the method 500 begins at block 502, in which the AI-based analysis tool performs and outputs process hazard analysis. The process hazard analysis can identify potential hazards in the simulated process.

At block 504, the AI-based analysis tool performs and outputs LOPA, which includes a protection configuration to mitigate each potential hazard, and risk metrics associated with the protection configuration and the potential hazards.

At block 506, the AI-based analysis tool creates (or generates) a Cause and Effect matrix. The matrix can include information, such as for example a mapping of the cause and effect relationships between the identified hazards, potential protection configuration and other components in the simulated process.

At block 508, the AI-based analysis tool generates SRS for the simulated process. The SRS can be generated based on, among other things, these relationships identified in the Cause and Effect matrix and the analysis of the simulated process.

At block 510, a safety application program, such as for integration with hardware, is created using the SRS. In some embodiments, the safety application program is for a PLC. The safety application program can be automatically generated using a program generator according to the SRS, or manually created/coded according to the SRS.

At block 512, the safety application program is tested. In some embodiments, the AI-based analysis tool can be used to test the safety application program, which is being implemented through a PLC or other simulator or on a PLC.

At block 514, addition safety application testing is performed on the safety application program.

At block 516, factory acceptance testing is performed.

At block 518, site acceptance testing is performed.

At block 520, plant operating phase is implemented.

Figure 6:
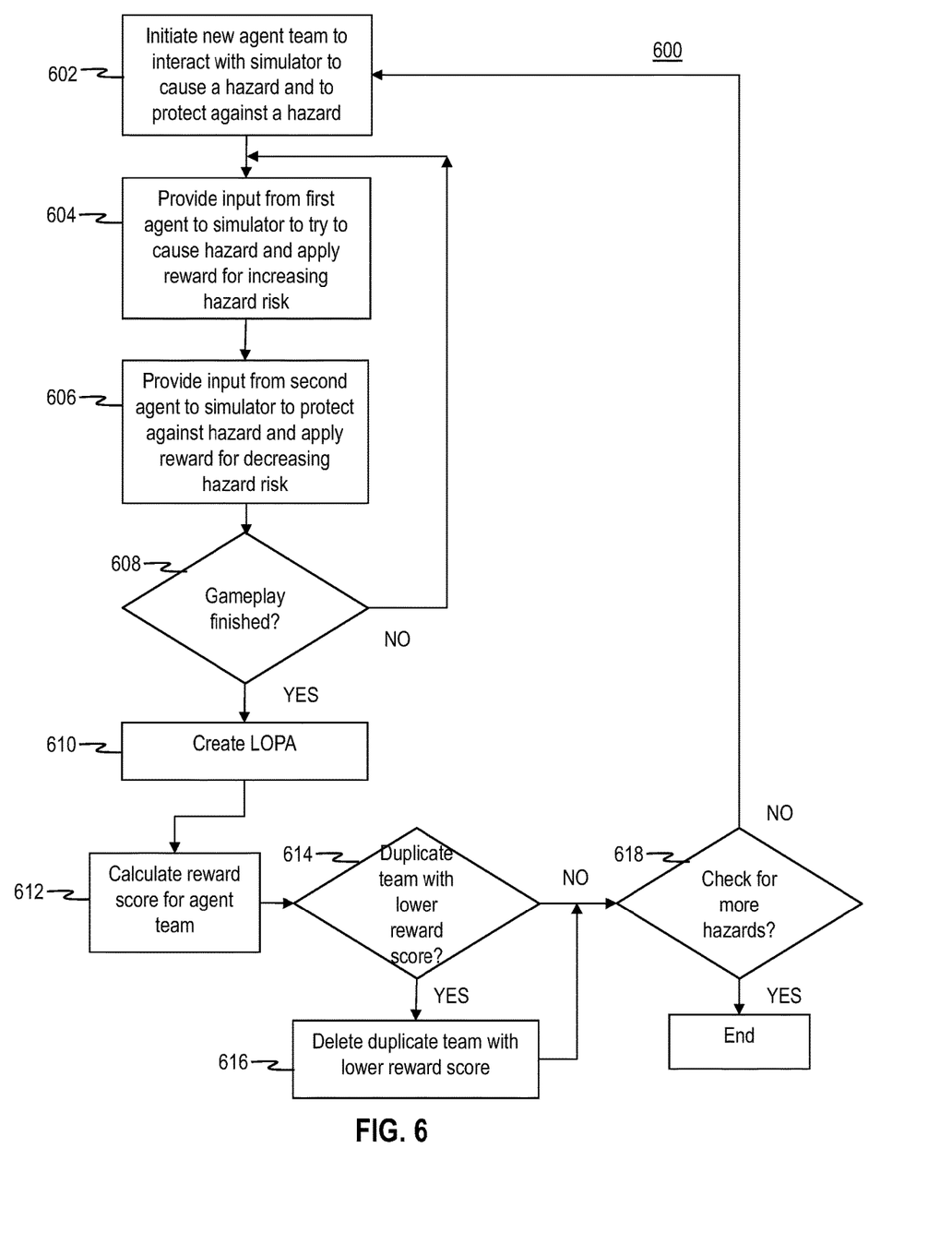
FIG. 6 illustrates an example method by which agent teams can be implemented using the AI-based analysis tool to analyze hazards of an industrial process, and create safety requirements for the process using reward-based machine learning techniques in accordance with an exemplary embodiment.

FIG. 6 illustrates a method 600 by which agent teams (also referred to as "Agent Teams") can be implemented using the AI-based analysis tool (e.g., 150) to analyze hazards of an industrial (or other process), and create safety requirements for the process using reward-based machine learning techniques, in accordance with an embodiment. In this example, the AI-based analysis tool can introduce agent teams, which interact with a process simulator to control the simulated process. Each agent team can include a first (or adversarial) agent and a second (or protective) agent.

At block 602, the AI-based analysis tool initiates a new agent team, with first and second agents to interact with the simulator to cause a hazard and to protect against a hazard, respectively, in the simulated process. The new agent team can be purposefully or randomly assigned specific input(s), such as defined by the process model, for changing a state of the operations conditions of the simulated process.

At block 604, the AI-based analysis tool provides input(s) from the first agent to the simulator to try to cause hazard (or hazardous condition), and applies a reward for increasing hazard risk. For example, a reward value of a point or other value can be given to the first agent for increasing the chance of a hazard or causing a hazard.

At block 606, the AI-based analysis tool provides input(s) from the second agent to the simulator to protect against hazard which the first agent seeks to cause, and applies a reward for decreasing hazard risk. For example, a reward value of a point or other value can be given to the second agent for decreasing the chance of the hazard or preventing the hazard.

At block 608, the AI-based analysis tool determines whether game play has finished between the first and second agents of the adversarial team. For example, game play can be considered complete: (1) if the gameplay by the agent team uncovers a potential hazard and a protection configuration (e.g., layers of protection) against the hazard, (2) if the gameplay by the agent team does not uncover any potential hazard after a predefined period (e.g., timed-out), and (3) other game completion rules. If gameplay has not finished, the method 600 proceeds back to blocks 606 and 608. Otherwise, the method 600 proceeds to block 610.

At block 610, the AI-based analysis tool creates a LOPA for the potential hazard and associated protection configuration (e.g., layers of protection) identified by the agent team.

At block 612, the AI-based analysis tool calculates a reward score for the agent team using a reward function(s) based on the accumulated reward points by the team. The reward function can be tailored to help identify which agent team has a more effective protection configuration solution where duplicate agent teams exist (e.g., agent teams identifying the same hazard, etc.).

At block 614, the AI-based analysis tool determines if there are any duplicate agent teams, and if so, which one of the duplicate agent teams has a lower reward score. If there are no duplicate agent teams, then the method 600 proceeds to block 618. If there are duplicate agent teams, the method 600 proceeds to block 616 in which the duplicate one of the agent teams with the lower reward score is deleted. In this way, it is possible to discover (or retain) the most effective protection configuration for each identified hazard in the simulated process. Thereafter, the method 600 proceeds to block 618.

At block 618, the AI-based analysis tool determines whether to check for more hazards. For example, if all hazardous possibilities have been traversed by the adversarial agent teams for the simulated process (e.g., all combination of inputs played by the agent teams, the analysis is timed-out, etc.). If not, the method 600 proceeds back to block 604 to initiate a new agent team. Otherwise, if no more hazards are to be checked, then the method 600 ends.

The methods shown and described for FIGS. 4-6 are provided as examples. As would be understood by those skilled in the art, the various operations described in these methods can be modified while still retaining the same or similar functionality (e.g., some operations can be implemented in a different order or combined, or can be omitted).

Figure 7:
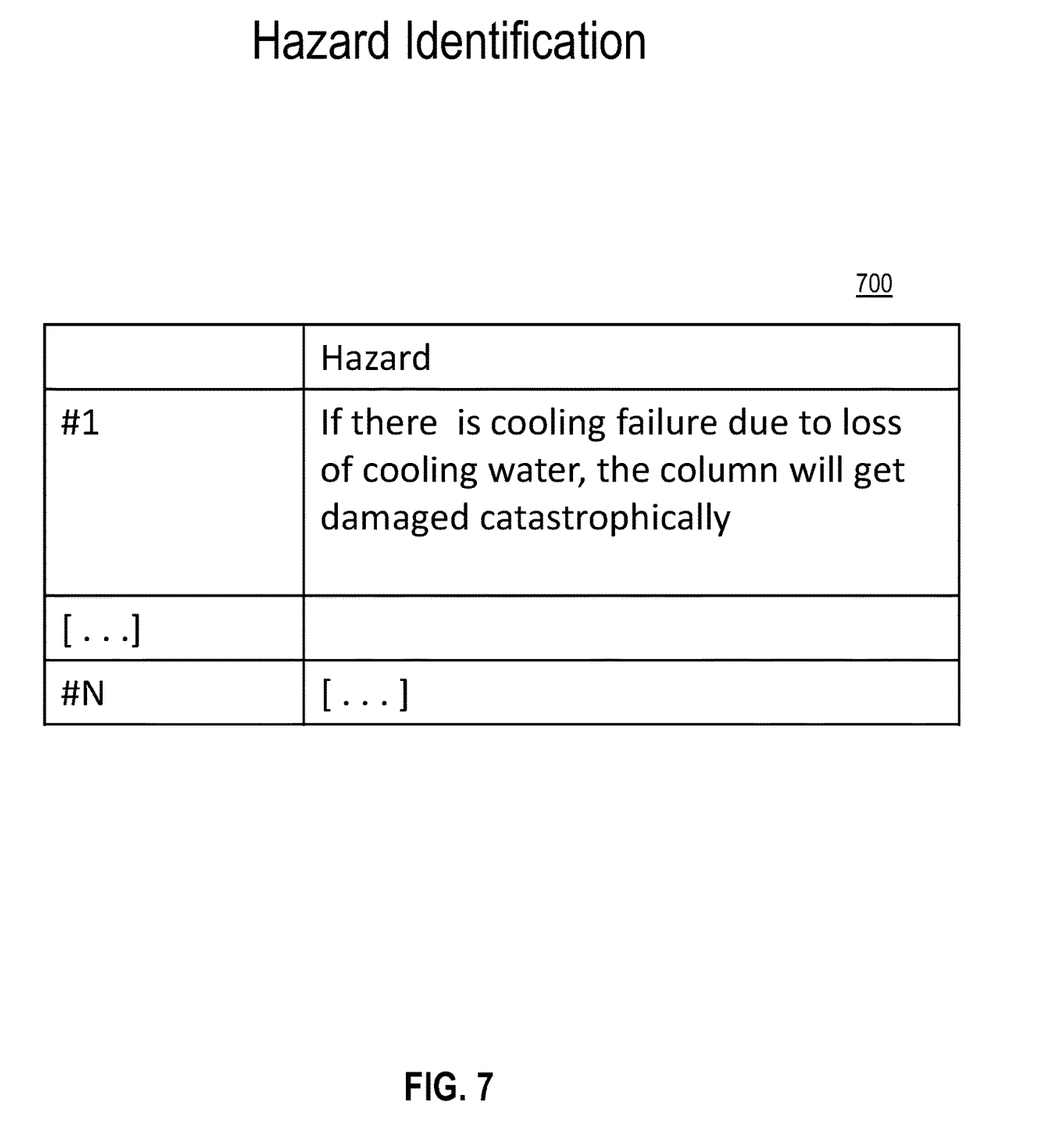
FIG. 7 illustrates an example of hazard information identified by the AI-based analysis tool in accordance with an exemplary embodiment.
Figure 8:
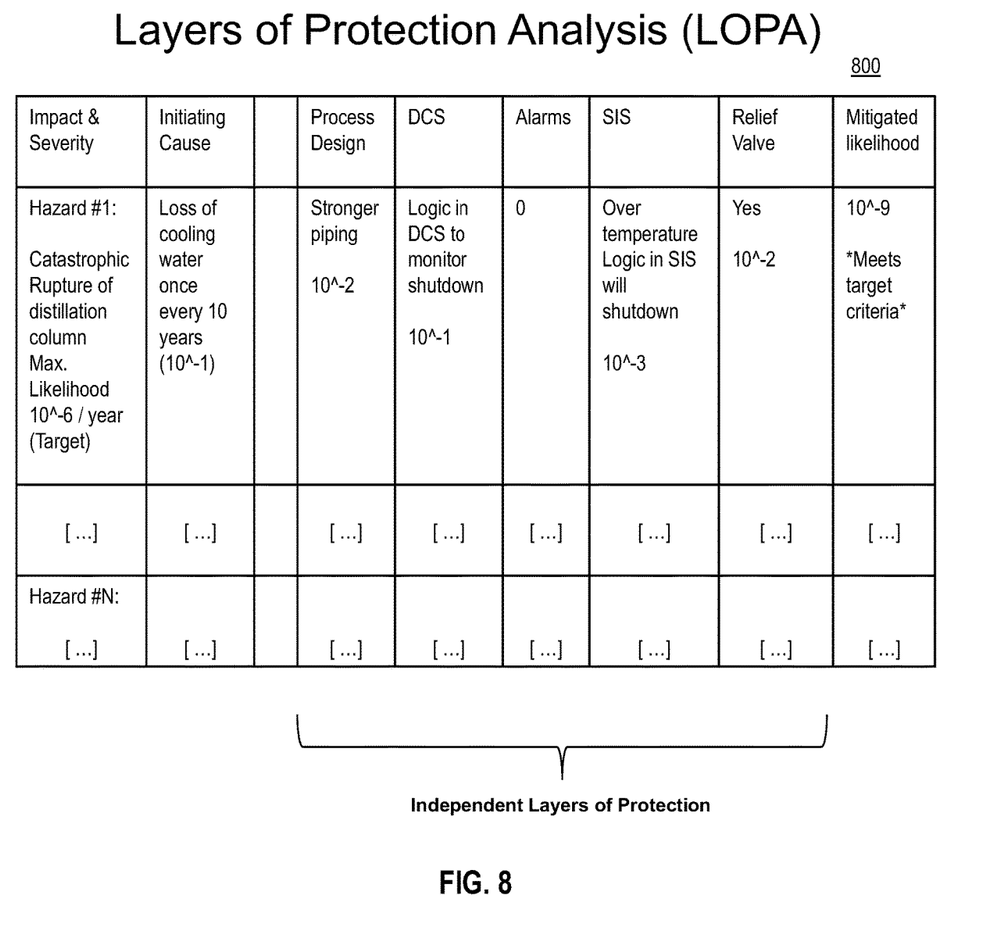
FIG. 8 illustrates an example of Layers of Protection Analysis (LOPA) created by the AI-based analysis tool in accordance with an exemplary embodiment.
Figure 9:
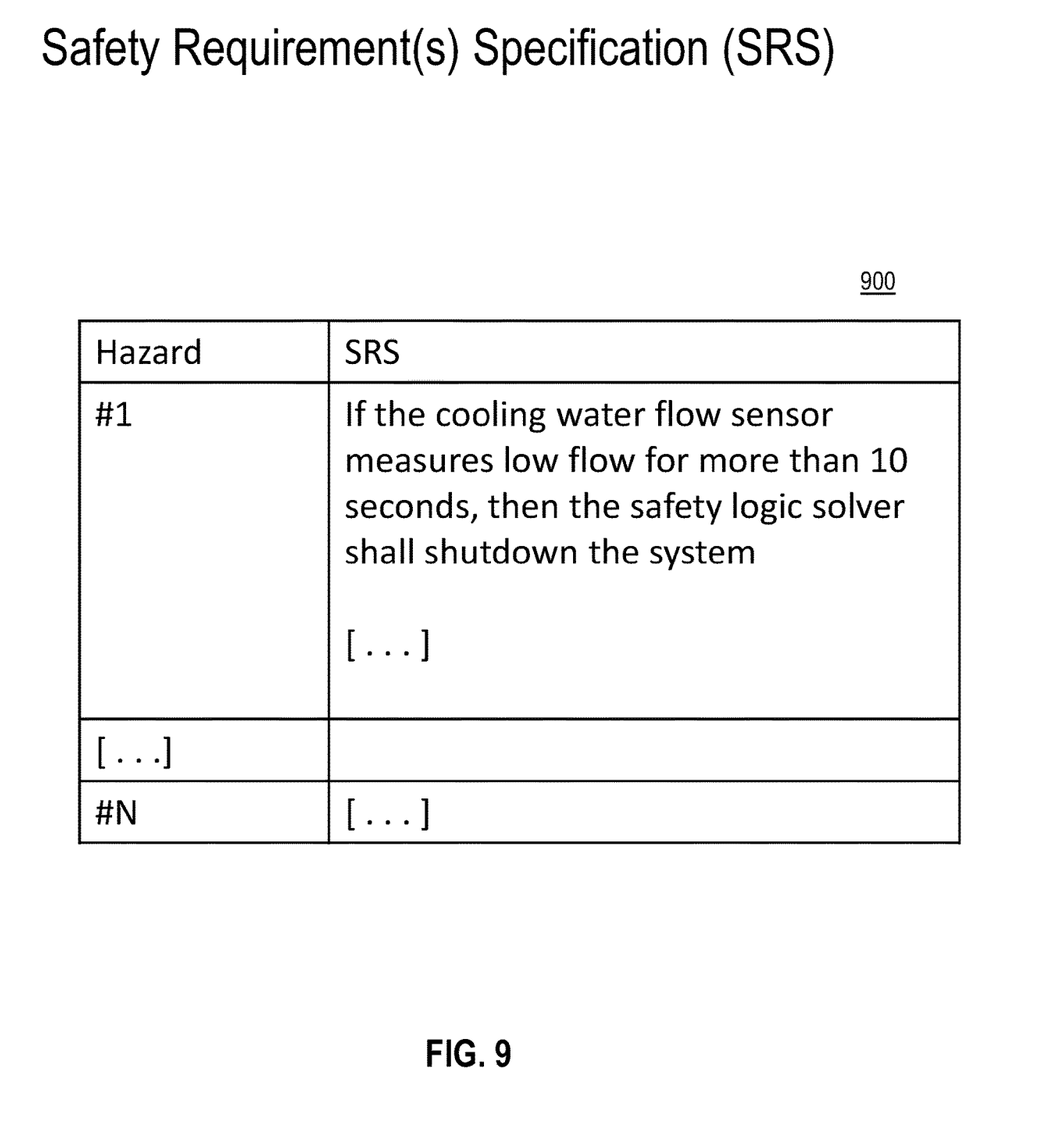
FIG. 9 illustrates an example of Safety Requirements Specification (SRS) created by the AI-based analysis tool in accordance with an exemplary embodiment.

An example of the information analyzed and created by the AI-based analysis tool is shown in FIGS. 7-9. For the purposes of explanation, in this example, an industrial process including column distillation is analyzed by the tool. FIG. 7 illustrates an example of hazard information identified by the AI-based analysis tool from the process hazard analysis. An example of an identified hazard can include: If there is cooling failure due to loss of cooling water, the column will get damaged catastrophically (e.g., Hazard #1). An example of Layers of Protection Analysis created by the AI-based analysis tool is shown in FIG. 8, which can include the following information: (1) Impact & Severity, (2) Initiating Cause, (3) Process Design, (4) Distributed Control System (DCS), (5) Alarms, (6) Safety Instrumented system (SIS), and (7) Relief Valve, and (8) Mitigating Likelihood. In this example, the Impact & Severity refers to the identified hazards, such as Hazard #1 (Catastrophic Rupture of distillation column) and its Target probability of occurring, e.g., $10^{\wedge}{-}6$ or $1\times10^{-6}$. For the Hazard #1, an Initiating Cause can be the loss of cooling water which has a probability of occurring once every 10 years (e.g., $10^{\wedge}{-}1$). The layers of protection can include:

Process Design: Stronger piping ($10^{\wedge}{-}2$),
DCS: Logic in DCS to monitor shutdown ($10^{\wedge}{-}1$),
Alarms: NO,
Safety Instrumented system (SIS): Over temperature Logic in SIS will shut down ($10^{\wedge}{-}3$), and
Relief Valve: YES ($10^{\wedge}{-}2$).

The Mitigated Likelihood refers to the likelihood that the layers of protection, which are independent in this example, can mitigate the hazard, e.g., the risk probability=(2)×(3)×(4)×(5)×(6)×(7)=$10^{\wedge}{-}9$ which is less than the Target criteria of $10^{\wedge}6$ for Hazard #1, and thus, meets the Target criteria. Each identified hazard for an industrial process can have an associated LOPA, which is created based on the hazard/safety analysis performed by the AI-based tool. The LOPA in FIG. 8 is simply provided as an example. Each analyzed industrial process can have a plurality of identified hazards (or hazardous conditions) and different layers of protection (including protection mechanisms not described in FIG. 8) can be identified to address the different hazards.

Furthermore, for this column distillation example, an example of the types of information contained in the Safety Requirements Specification (SRS), which can be created by the AI-based analysis tool, is shown in FIG. 9. For instance, to address the Hazard #1, the SRS can include: If the cooling water flow sensor measures low flow for more than 10 seconds, then the safety logic solver shall shutdown the system. The SRS can be derived by the AI-based analysis tool from Cause and Effect matrix (or similar relational information), which can identify cause and effect relationships associated with the industrial process as defined by the simulated process model and the hazard analysis performed by the AI-based analysis tool. An example of information in this matrix can be, for example, low flow then shut down through SIS, etc.

The example embodiments of FIGS. 7-9 and its above description are provided as non-limiting examples of information or data, which may be reflected or contained in Hazard information, LOPA, Cause and Effect matrix, and SRS.

Figure 10:
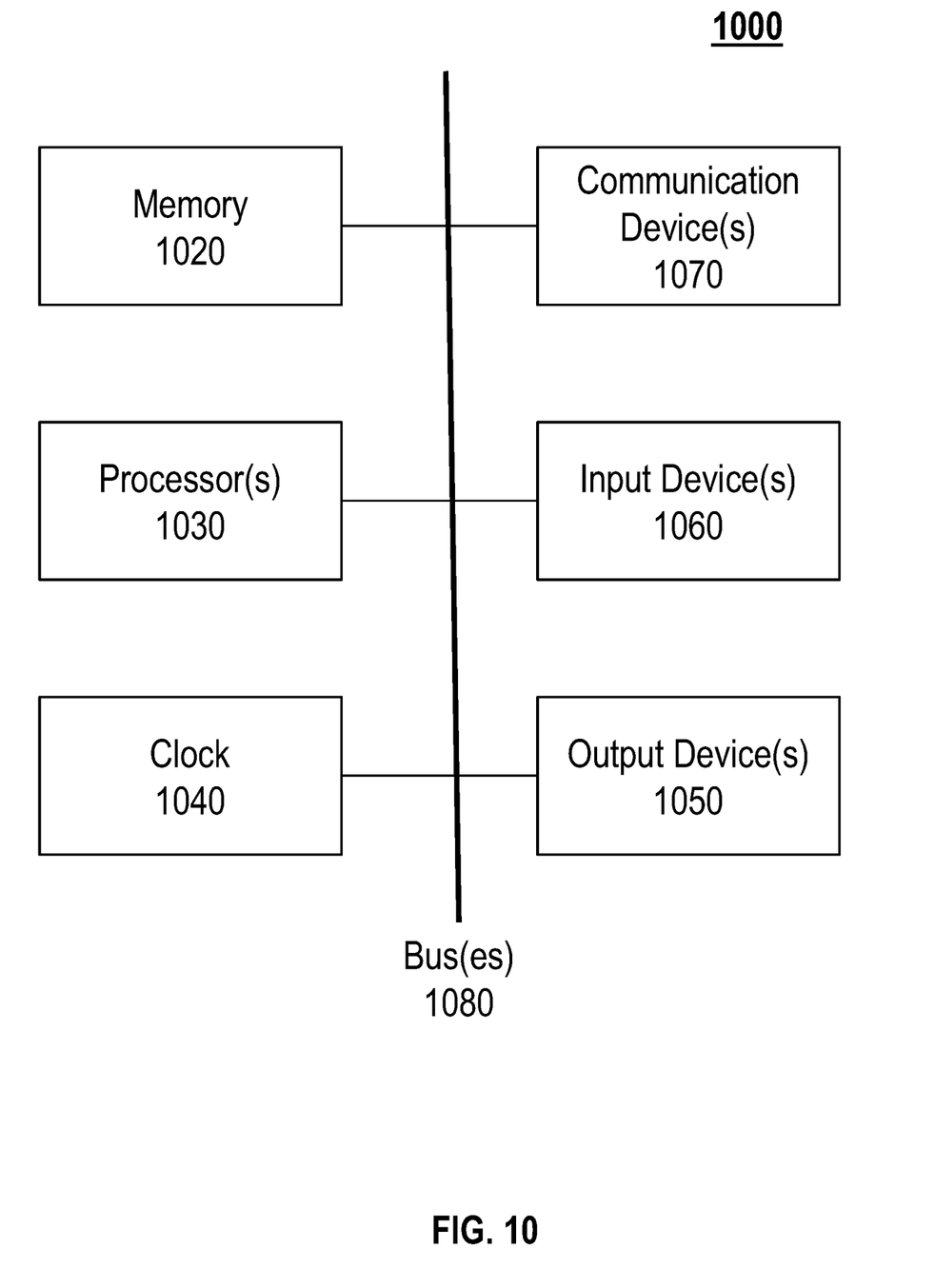
FIG. 10 illustrates example components of a computer or computing system accordance with an exemplary embodiment.

FIG. 10 illustrates example components of a computer system (or computing system) 1000, in accordance with an embodiment. As shown in FIG. 10, the computer system 1000 can include, for example, memory 1020, processor(s)

1030, clock 1040, output device(s) 1050, input device(s) 1060, communication device 1070, and a bus system 1080 between the components of the computer system.

The memory 1020 can store computer executable code, programs, software or instructions, which when executed by a processor(s), controls the operations of the computer system 1000, including the various methods/processes described herein. The memory 1020 can also store other data used by the computer system 1000 or components thereof to perform the operations described herein. The other data can include but is not limited to process model(s) of industrial processes to be analyzed, hazard analysis data (e.g., identified hazards, etc.), layers of protection (e.g., LOPA), cause and effect relationships (e.g., Cause and Effect Matrix), safety requirements (e.g., SRS), safety application program(s), and other information described herein.

The output device(s) 1050 can include a display device, printing device, speaker, and so forth. For example, the output device(s) 1050 may output for display or present graphical user interface (GUI), reports of the hazard/safety analysis, or other data or information, such as described herein.

The input device(s) 1060 can include any user input device such as a mouse, trackball, microphone, touch screen, a joystick, control console, keyboard/pad, touch screen or other device operable by a user. The input device(s) 1060 may also accept data from external sources, such other devices and systems.

The processor(s) 1030, which interacts with the other components of the computer system, is configured to control or implement the various operations described herein. These operations can include implementing the AI-based tool to analyze industrial processes, creating application program based on analysis information generated by the AI-based tool (e.g. SRS), testing the created application program using the AI-based tool, and other processes described herein.

The above describes example components of a computer system such as a computer, server or other data processing system. The output device and input devices 1050 and 1060 respectively may communicate with the processor 1030 over a local bus or a network. The computer system may be a distributed processing system.

It should also be understood that the example embodiments disclosed and taught herein are susceptible to numerous and various modifications and alternative forms. Thus, the use of a singular term, such as, but not limited to, "a" and the like, is not intended as limiting of the number of items. Furthermore, the naming conventions for the various components, functions, characteristics, thresholds, and other elements used herein are provided as examples, and can be given a different name or label. The use of the term "or" is not limited to exclusive "or", but can also mean "and/or".

It will be appreciated that the development of an actual, real commercial application incorporating aspects of the disclosed embodiments will require many implementation specific decisions to achieve the developer's ultimate goal for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

Using the description provided herein, the example embodiments may be implemented as a machine, process, or article of manufacture by using standard programming and/or engineering techniques to produce programming software, firmware, hardware or any combination thereof.

Any resulting program(s), having computer-readable program code, may be embodied on one or more tangible or non-transitory computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable or storage medium or in any transmitting medium which transmits such a program.

A processor(s) or controller(s) as described herein can be a processing system, which can include one or more processors, such as CPU, controller, or other processing unit, which controls the operations of the devices or systems, described herein. Memory/storage devices can include, but are not limited to, disks, solid state drives, optical disks, removable memory devices such as smart cards, SIMs, WIMs, semiconductor memories such as RAM, ROM, PROMS, etc. Transmitting mediums or networks include, but are not limited to, transmission via wireless communication (e.g., Radio Frequency (RF) communication, Bluetooth®, Wi-Fi, Li-Fi, etc.), the Internet, intranets, telephone/modem-based network communication, hard-wired/cabled communication network, satellite communication, and other stationary or mobile network systems/communication links.

While particular embodiments and applications of the present disclosure have been illustrated and described, it is to be understood that the present disclosure is not limited to the precise construction and compositions disclosed herein and that various modifications, changes, and variations can be apparent from the foregoing descriptions without departing from the invention as defined in the appended claims.

The invention claimed is:
1. A method of analyzing process hazards and validating protection mechanisms for an industrial process, comprising:
  establishing communication between a simulation tool and a process hazard analysis tool, the simulation tool being configured to simulate operation of the industrial process according to a process model, the simulation tool and the process hazard analysis tool being executed on or across one or more computers;
  creating, using the process hazard analysis tool, conditions for hazards in the industrial process based on information learned about the industrial process from the simulation tool;
  for each of the hazards, simulating the hazards using the simulation tool and attempting to prevent the hazards using the process hazard analysis tool by introducing one or more protective mechanisms from a plurality of potential protective mechanisms to the industrial process;
  evaluating effectiveness of the introduced protective mechanisms for each of the hazards and creating safety requirements for the industrial process based on the evaluated effectiveness;
  generating an application program for a safety programmable logic controller in a safety instrumented system to satisfy the safety requirements; and testing the application program to confirm that the application program is able to prevent the hazards in the industrial process.

2. The method according to claim 1, wherein, to simulate the hazards and/or to evaluate effectiveness, the process hazard analysis tool implements a plurality of agents for interacting with the simulation tool and for changing operating conditions in the industrial process simulated by the simulation tool, the plurality of agents including:
at least one first agent to cause conditions for hazards in the industrial process simulated by the simulation tool, and
at least one second agent to introduce protective mechanisms to prevent hazard conditions in the industrial process simulated by the simulation tool.

3. The method according to claim 2, wherein, to simulate the hazards and/or to evaluate effectiveness, the process hazard analysis tool is configured to:
initiate a plurality of adversarial agent teams each of which comprises first and second agents;
for each adversarial agent team, assign randomly one or more inputs, associated with the process model, for use by the adversarial agent team to control an operational state of the industrial process simulated by the simulation tool;
for each adversarial agent team, assign reward points when the respective first agent increases a chance of an associated hazard and/or when the respective second agent decreases a chance of the associated hazard;
for each adversarial agent team, create a protection configuration including layers of protection for the associated hazard according to the interaction between the first and second agents of the adversarial agent team;
for each adversarial agent team, calculate a reward score for the adversarial agent team using a reward function according to reward points accumulated by the adversarial agent team; and
eliminate duplicative adversarial agent team(s) from the plurality of adversarial agent teams according to their reward scores.

4. The method according to claim 3, wherein the process hazard analysis tool creates safety requirements for the industrial process based on the protection configuration of the remaining adversarial agent teams from the plurality of adversarial agent teams.

5. The method according to claim 4, wherein the application program is tested using the process hazard analysis tool and the simulation tool to confirm that the application program is able to prevent the hazards in the industrial process, the first agent of the process hazard analysis tool causing conditions for hazards in the industrial process simulated by the simulation tool, the application program preventing hazard conditions in the industrial process simulated by the simulation tool.

6. The method according of claim 2, wherein the process hazard analysis tool is further configured to generate a cause and effect matrix associated with inputs to and outputs from the simulation tool when simulating the industrial process, and to create the safety requirements according to the cause and effect matrix.

7. The method according to claim 6, wherein the inputs comprise an addition of protective mechanisms by the second agent into the industrial process simulated by the simulation tool.

8. The method according to claim 6, wherein the outputs comprise a state of the operating conditions of the industrial process simulated by the simulation tool.

9. The method according to claim 2, wherein the protective mechanisms comprises at least one safety instrumented system which includes a set of equipment intended to reduce the risk due to a specific hazard.

10. The method according to claim 2, wherein the first and/or second agent is configured to control and monitor operating conditions in the industrial process simulated by the simulation tool according to the process model which is constrained by physical laws, scientific laws, and/or laws of nature.

11. A system of analyzing process hazards and validating protection mechanisms for an industrial process, comprising:
memory; and
one or more processors configured to:
establish communication between a simulation tool and a process hazard analysis tool, the simulation tool being configured to simulate operation of the industrial process according to a process model, the simulation tool and the process hazard analysis tool being executed on or across one or more computers;
create, using the process hazard analysis tool, conditions for hazards in the industrial process based on information learned about the industrial process from the simulation tool;
for each of the hazards, simulate the hazards using the simulation tool and attempt to prevent the hazards using the process hazard analysis tool by introducing one or more protective mechanisms from a plurality of potential protective mechanisms to the industrial process;
evaluate effectiveness of the introduced protective mechanisms for each of the hazards and create safety requirements for the industrial process based on the evaluated effectiveness;
generate an application program for a safety programmable logic controller in a safety instrumented system to satisfy the safety requirements; and
test the application program to confirm that the application program is able to prevent the hazards in the industrial process.

12. The system according to claim 11, wherein, to simulate the hazards and/or to evaluate effectiveness, the process hazard analysis tool implements a plurality of agents for interacting with the simulation tool and for changing operating conditions in the industrial process simulated by the simulation tool, the plurality of agents including:
at least one first agent to cause conditions for hazards in the industrial process simulated by the simulation tool, and
at least one second agent to introduce protective mechanisms to prevent hazard conditions in the industrial process simulated by the simulation tool.

13. The system according to claim 12, wherein, to simulate the hazards and/or to evaluate effectiveness, the process hazard analysis tool is configured to:
initiate a plurality of adversarial agent teams each of which comprises first and second agents;
for each adversarial agent team, assign randomly one or more inputs, associated with the process model, for use by the adversarial agent team to control an operational state of the industrial process simulated by the simulation tool;
for each adversarial agent team, assign reward points when the respective first agent increases a chance of an associated hazard and/or when the respective second agent decreases a chance of the associated hazard;

for each adversarial agent team, create a protection configuration including layers of protection for the associated hazard according to the interaction between the first and second agents of the adversarial agent team;

for each adversarial agent team, calculate a reward score for the adversarial agent team using a reward function according to reward points accumulated by the adversarial agent team; and eliminate duplicative adversarial agent team(s) from the plurality of adversarial agent teams according to their reward scores.

14. The system according to claim 13, wherein the process hazard analysis tool creates safety requirements for the industrial process based on the protection configuration of the remaining adversarial agent teams from the plurality of adversarial agent teams.

15. The system according to claim 14, wherein the application program is tested using the process hazard analysis tool and the simulation tool to confirm that the application program is able to prevent the hazards in the industrial process, the first agent of the process hazard analysis tool causing conditions for hazards in the industrial process simulated by the simulation tool, the application program preventing hazard conditions in the industrial process simulated by the simulation tool.

16. The system according to claim 12, wherein the process hazard analysis tool is further configured to generate a cause and effect matrix associated with inputs to and outputs from the simulation tool when simulating the industrial process, and to create the safety requirements according to the cause and effect matrix.

17. The system according to claim 16, wherein the inputs comprise an addition of protective mechanisms by the second agent into the industrial process simulated by the simulation tool.

18. The system according to claim 16, wherein the outputs comprise a state of the operating conditions of the industrial process simulated by the simulation tool.

19. The system according to claim 12, wherein the protective mechanisms comprises at least one safety instrumented system which includes a set of equipment intended to reduce the risk due to a specific hazard.

20. The system according to claim 2, wherein the first and/or second agent is configured to control and monitor operating conditions in the industrial process simulated by the simulation tool according to the process model which is constrained by physical laws, scientific laws, and/or laws of nature.

21. A non-transitory computer medium storing computer executable code, which when executed by one or more processors, is configured to implement a method of analyzing process hazards and validating protection mechanisms for an industrial process, the method comprising:

establishing communication between a simulation tool and a process hazard analysis tool, the simulation tool being configured to simulate operation of the industrial process according to a process model, the simulation tool and the process hazard analysis tool being executed on or across one or more computers;

creating, using the process hazard analysis tool, conditions for hazards in the industrial process based on information learned about the industrial process from the simulation tool;

for each of the hazards, simulating the hazards using the simulation tool and attempting to prevent the hazards using the process hazard analysis tool by introducing one or more protective mechanisms from a plurality of potential protective mechanisms to the industrial process;

evaluating effectiveness of the introduced protective mechanisms for each of the hazards and creating safety requirements for the industrial process based on the evaluated effectiveness;

generating an application program for a safety programmable logic controller in a safety instrumented system to satisfy the safety requirements; and testing the application program to confirm that the application program is able to prevent the hazards in the industrial process.

* * * * *